United States Patent Office 3,250,261
Patented May 10, 1966

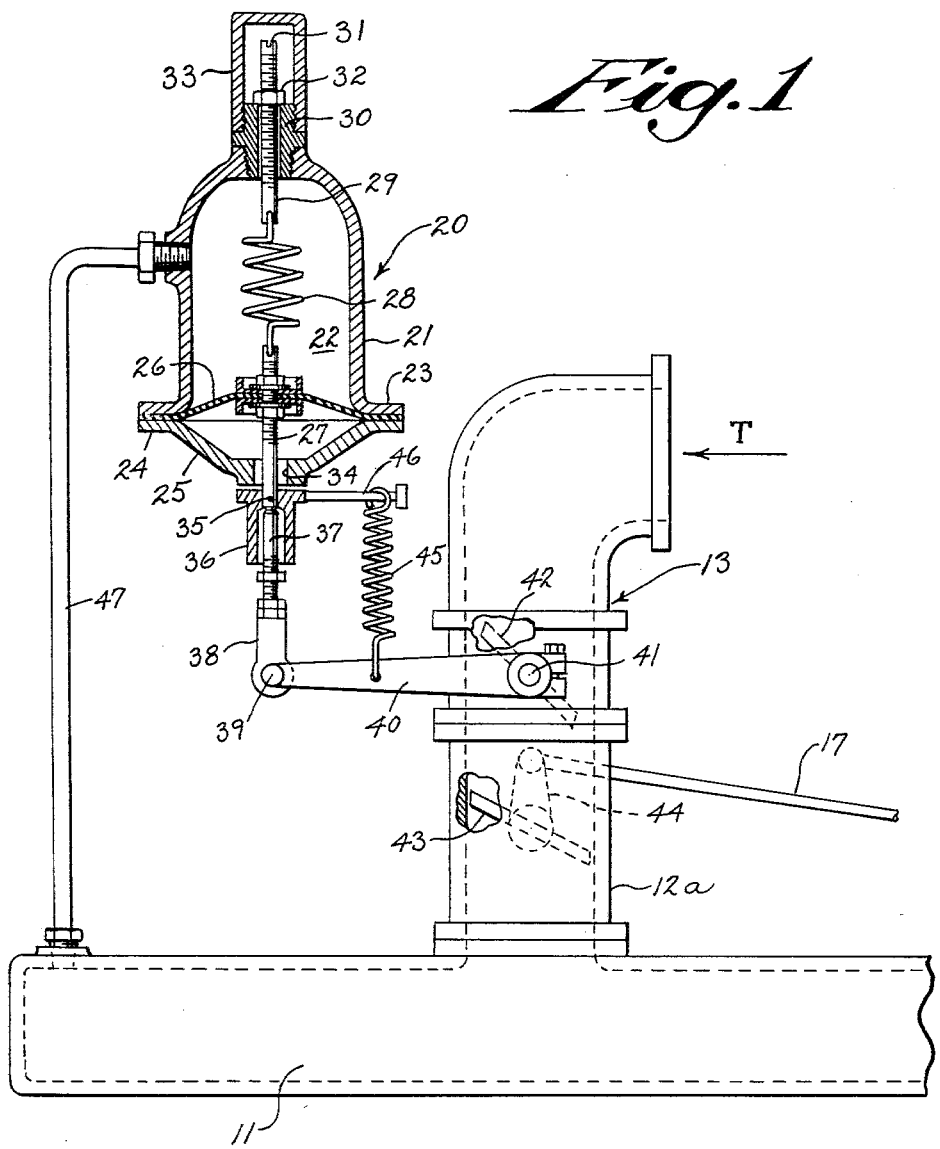

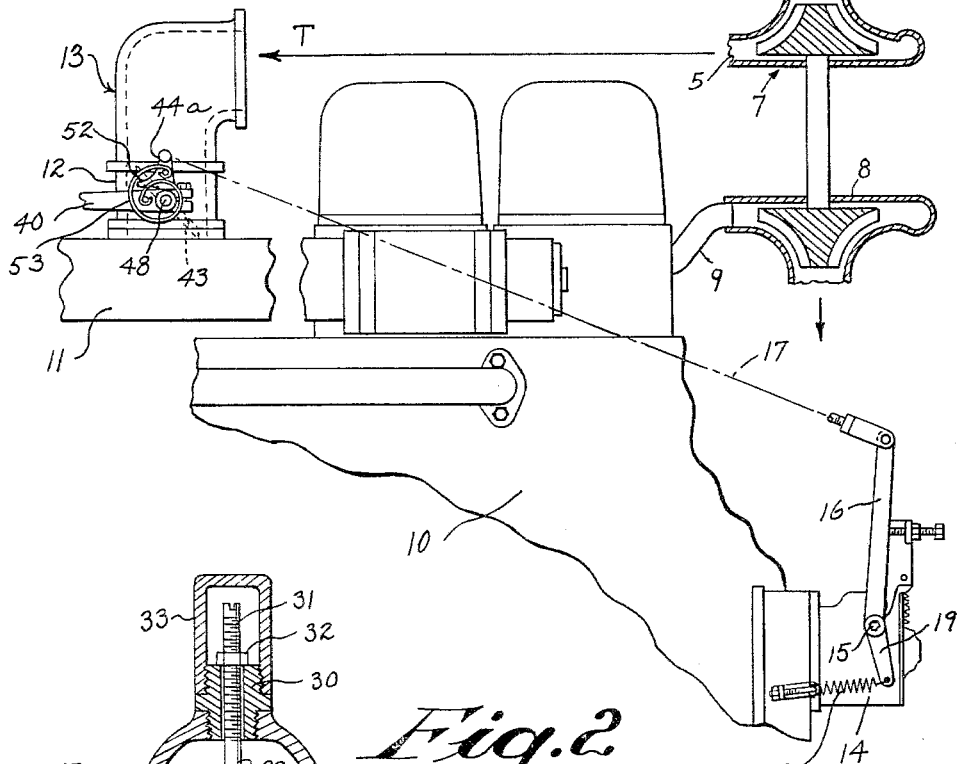
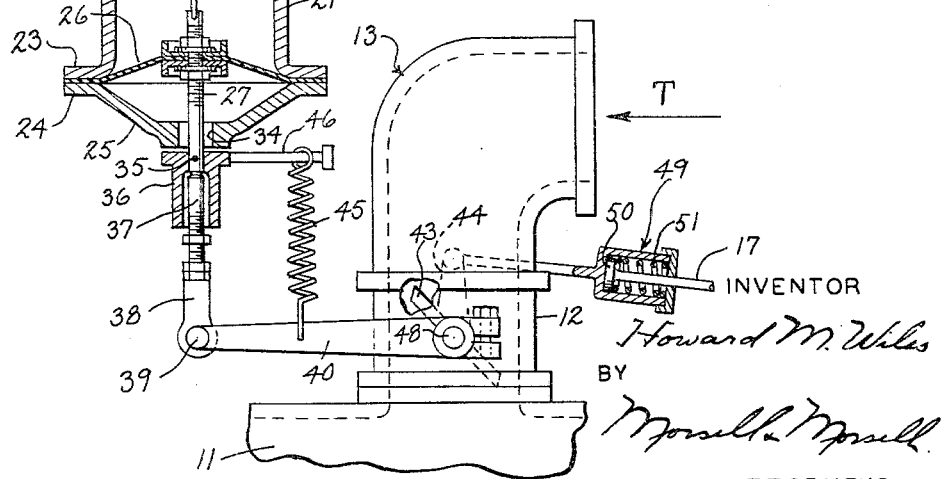

3,250,261
LIMITING DEVICE FOR CARBURETED TURBO-
CHARGED GAS OR GASOLINE ENGINES
Howard M. Wiles, Waukesha, Wis., assignor to Waukesha
Motor Company, Waukesha, Wis., a corporation of
Wisconsin
Filed Nov. 15, 1963, Ser. No. 323,988
2 Claims. (Cl. 123—103)

This invention relates to improvements in limiting device for carbureted turbocharged gas or gasoline engines, and more particularly to a device for limiting the ability of a turbocharged gas or gasoline engine to progressively increase its power output as the engine governor opens the throttle, said governor action occurring whenever the load tends to cause a decrease in speed of the engine.

Whenever a turbocharged gas or gasoline engine is in operation it normally delivers increasing power as the engine butterfly valve is opened. This in turn drives the turbocharger faster and in turn provides more fuel and air to the engine and a pyramiding of power up to a possible unsafe engine output.

It is a general object of the present invention to provide an improved device of the class described wherein, as the butterfly valve opens wider to give the engine greater output and a higher intake manifold pressure, said intake manifold pressure is utilized for the purpose of independently controlling the air flow to the manifold regardless of the action of the governor, to thereby limit the air flow into the manifold so that a turbocharged engine will not have an unsafe output. The present device is to be distinguished from the speed governing mechanism for a conventional internal combustion engine disclosed in Patent No. 2,221,201 of November 12, 1940, wherein there is a compensator which operates in response to vacuum variations in the intake manifold to vary the loading of the fly-weight resisting spring of the governor. The present limiting device is for use in a turbocharged engine as distinguished from the conventional engine of the prior patent, and is for the purpose of preventing the turbocharger from continually providing more and more fuel and air and more power up to a possible unsafe engine output.

A more specific object of the invention is to provide, in a carbureted turbocharged gas or gasoline engine, a pneumatic compensator responsive to a predetermined positive pressure in the intake manifold to reduce or limit the air flow into the engine independently of the operation of the governor.

A further object of the invention is to provide an improved limiting device as above described wherein the limiting device may have several embodiments such as a first one when it acts on a separate butterfly valve to limit the flow of air to the engine, or a second where it acts on the regular butterfly valve in conjunction with the use of a spring loaded collapsible control rod between the governor and the butterfly lever, or a third where it may act as a variable stop device in conjunction with a spring loaded butterfly lever.

A more specific object of the invention is to provide a limiting device of the class described which can be adjusted to permit a slight increase in output and thereby give a torque build-up feature while at the same time providing a maximum limit on power output.

With the above and other objects in view, the invention consists of the improved limiting device for carbureted turbocharged gas or gasoline engines, and all of its parts and combinations, as set forth in the claims, and all equivalents thereof.

In the accompanying drawings, illustrating several preferred embodiments of the invention:

FIG. 1 is a partially diagrammatic elevational view showing the device in conjunction with an intake manifold and carburetor, wherein the limiting device acts on a separate special butterfly valve, the main portion of the limiting device being shown in vertical section and other parts being broken away;

FIG. 2 is a fragmentary view similar to parts of FIG. 1 showing a modification wherein the limiting device acts in conjunction with a spring loaded collapsible control rod between the governor and the regular butterfly valve; and FIG. 3 is a partially diagrammatic view showing another embodiment of the limiting device in conjunction with a fragment of a turbocharged engine and showing the engine governor, parts being broken away.

Referring more particularly to the drawings, first to FIG. 3, all embodiments of the device are designed for use in conjunction with a turbocharged engine such as is identified by the numeral 10 in FIG. 3. The engine includes an exhaust conduit 9 connected to the housing of a turbine wheel 8 of a supercharger 7, the latter having a conduit 5 which is adapted to be connected with the carburetor 13 to deliver turbocharged air, as indicated by the arrow T, under positive pressure.

This engine has an intake manifold 11 to which conduits forming a butterfly valve housing 12 of a carbureor 13 are connected. The engine 10 has an engine-driven conventional fly-weight governor 14 and the governor has a rockshaft 15 which is adapted to be rocked by governor action to cause swinging of a lever 16. The latter is connected by a control rod 17 to a butterfly valve lever, as will be hereinafter described, for the purpose of maintaining engine speed substantially constant regardless of load. The usual governor spring 18, acting on a lever 19 which is rigidly connected to the rockshaft 15, normally urges the butterfly valve of the carburetor to open position.

It is contemplated that the engine and governor of FIG. 3 will be used in conjunction with the other exemplifications of the invention. The illustration of the engine and governor has not been repeated in FIGS. 1 and 2 in order to enable the principal parts to be shown in larger size.

Referring now to FIG. 1, the principal part of the load limiting device or servo-motor is designated by the numeral 20. It includes an inverted cup-shaped housing portion 21 enclosing a pressure chamber 22. The lower end of the housing 21 has an annular flange 23 which coacts with the annular flange 24 of a bottom closure member 25 to clamp a flexible diaphragm 26 between the flanges. Extending through the center of the diaphragm and suitably sealed thereto is a stem 27. The upper end of the stem is connected to the lower end of a tension spring 28. The upper end of the tension spring is connected to an adjustment screw 29 which extends slideably through a top plug 30. The upper end of the screw is slotted, as at 31, and there is an adjustment nut 32 which may be set to pre-load the spring 28 with proper tension for a predetermined pressure level. A threaded cap 33 may cover the adjustment screw and nut.

The lower end of the diaphragm stem projects slideably through an opening 34 in the bottom closure member, and a rod guide 35 is pinned to the lower end of the stem 27. The lower portion of the rod guide is tubular, as at 36, to slideably receive the upper end of a push rod 37. The push rod has a threaded lower portion adjustably received in a fitting 38 and the lower end of the fitting is pivoted, as at 39, to the outer end of a control lever 40, the inner end of said lever, in the form of the invention of FIG. 1, being rigid with the shaft 41 for a a separate butterfly valve 42 in the carburetor 13. In the form of the invention of FIG. 1 there is a separate butterfly valve housing 12(a) in which the other butterfly valve 43 is located. This butterfly valve has a lever 44 which is connected to the end of the governor rod 17.

The upper end of the push rod 37 is normally urged into contact with the lower end of the diaphragm stem 27 by means of a spring 45 which is connected between an intermediate portion of the control lever 40 and a spring holder 46, the latter projecting laterally from the rod guide 35.

The pneumatic chamber 22 of the casing 21 is connected by a pressure line 47 with the intake manifold 11, whereby pressure from the intake manifold may be communicated through the line 47 to the chamber 22 to act on the diaphragm 26 therein, as will be hereinafter explained in greater detail.

In the form of the invention of FIG. 2 only the single butterfly valve 43 is employed and its shaft 48 has an end projecting externally in one direction and carrying the limiting device lever 40 rigidly thereon. The opposite end of the butterfly shaft 48 carries the usual butterfly valve operating lever 44, which lever is connected to the control rod 17 leading from the governor. However, in the form of the invention of FIG. 2 there is a spring loaded collapsible connection 49, the end of the governor rod having a piston head 50 which acts against a spring 51 whereby the governor control rod 17 may, under certain conditions, pull in one direction while the limiting device is acting in the reverse direction.

In the form of the invention of FIG. 3 the arrangement is the same as in FIG. 2 except that instead of the spring loaded collapsible connection 49 the governor control rod 17 is rigid throughout its length and connects directly with the butterfly lever 44(a). Here, however, the lever 44(a) is loose on the rockshaft 48 and it has a projecting lug 52 positioned to engage a side of the limiting device control lever 40 during valve closing movement. A watch spring 53 connects the butterfly lever 44(a) to the limiting device control lever 40. This spring accomplishes the same function as the collapsible member 49 of FIG. 2 in that it permits the governor control rod 17 to pull in one direction while the limiting device is acting in a reverse directon under certain conditions.

Operation

In operation, first of the form of the invention of FIG. 1 it is assumed that the governor control rod 17 is connected to a governor such as the governor 14 of FIG. 3 on an engine such as the engine 10 of FIG. 3. During normal operation, as a load is applied to the engine, the governor tends to maintain the engine speed substantially constant by progressively opening the butterfly valve 43 to provide increased flow of fluid from the carbureor 13 to the intake manifold. Inasmuch as this is a turbocharged engine, as the output increases the turbocharger is driven faster, and this in turn delivers more turbocharged air into the carburetor 13, as indicated by the arrow T. Thus there is a pyramiding of power up to a possible unsafe engine output.

The present invention is designed to put a limit on such pyramiding. Accordingly, with the present invention as the butterfly valve 43 is opened wider by the governor the engine has greater output and hence a higher pressure in the intake manifold 11. This higher pressure is transimitted through the pressure line 47 into the pressure chamber 22 of the limiting device 20. When this pressure exceeds a predetermined maximum it will act on the diaphragm 26, against the tension of the spring 28, to push downwardly on the diaphragm stem 27. This in turn acts on the push rod 37 to push downwardly on the outer end of the control lever 40 and rock the shaft 41 of the independent butterfly valve 42 toward valve closing position, thus limiting the flow of the turbocharged air T to the manifold regardless of the action of the governor controlled butterfly valve 43.

In the form of the invention of FIG. 2, it is also assumed that the manifold 11 is the manifold of a turbocharged engine such as the engine 10 of FIG. 3, with the control rod 17 leading to a governor such as the governor 14 of FIG. 3. In this form of the invention only the regular carbureter butterfly valve is employed, said valve being indicated by the numeral 43. In this form of the invention as the load on the engine is increased to decrease the speed of the engine the governor causes a pull to be exerted on the rod 17 which normally opens the butterfly valve to increase the power output. Should, however, the increase of power output be pyramided as a result of the action of the turbocharger to an unsafe output, as heretofore explained in connection with FIG. 1, the pressure from the manifold 11 will be communicated through the pressure line 47 to the limiting device 20 to cause downward movement of the diaphragm rod 27 as heretofore explained in connection with FIG. 1, and a downward pressure on the lever 40 in a butterfly valve closing direction. Such action may occur even though the governor is pulling in an opening direction on the rod 17, as the spring loaded member 49 allows the governor to move toward full load without moving the butterfly valve 43, assuming that the pressure in the pressure chamber 22 is above the predetermined maximum. As the engine slows down the pressure 22 is reduced, allowing the butterfly valve 43 to open up under the action of the governor and thereby again increasing the available power.

In the form of the invention of FIG. 3, the operation is similar to that heretofore described in connection with FIG. 2, and the same limiting device 20 is employed as illustrated in FIGS. 1 and 2. Here, as in the other embodiments, when the pressure in the pressure chamber 22 is below a predetermined point, the spring 28 will tend to maintain the diaphragm in a raised position, and the spring 45 will keep the push rod 37 in contact with the lower end of the diaphragm stem 27, thereby maintaining the butterfly valve in open condition, the butterfly valve being under the control of the governor through the spring connection 53 which in effect corresponds to the collapsible spring arrangement 49 of FIG. 2. If, however, action of the turbocharger causes pyramiding of power to an unsafe point, then the pressure in the manifold 11 will exceed the prodetermined maximum and will push downwardly on the lever 40 to move the butterfly valve toward closing position and thereby limiting the output. The spring 53 allows this movement of the control lever 40 and butterfly valve regardless of the action of the governor upon the lever 44(a) which is mounted loosely on the rock shaft 48. When the action is under control of the governor, and when the latter is operating the valve toward closing position, then the lug 52 on the lever 44(a) is engageable with the lever 40 to urge it and the butterfly valve toward said closing position.

The limiting device may be initially set, through manipulation of the adjustment nut 32, to provide a normal torque increase as is desirable during normal operation while still providing a maximum limit on engine output. This torque increase is determined by the rate of the spring 28 together with the pre-loading tension provided by a nut 32.

It should be noted that, if desired, the lever 40 and rod 37 may be manually pulled down independently of the action of the limiting device to idle the engine.

In the form of the invention of FIG. 1 the "butterfly valve means" comprises two separate butterfly valves 42 and 43 and in the forms of the invention shown in FIGS. 2 and 3 it comprises but a single butterfly valve 43. In the claims, whenever the term "control means" is employed it contemplates either the single butterfly valve or the dual butterfly valve of FIG. 1.

Various changes and modifications may be made without departing from the spirit of the invention, and all such changes are contemplated as may come within the scope of the claims.

What I claim is:

1. In combination with an engine having a turbocharger with a turbine and having an engine exhaust system connected with the turbine to drive the latter, and said engine having a carburetor with control means for controlling the flow of air through the carburetor to the engine, which control means includes the throttle valve of said carburetor, and said engine having an engine-driven governor connected to said control means for controlling the latter, an air-operated servo-motor connected to said carburetor control means, spring means urging said carburetor-control means in one direction, and a connection between the intake manifold and servo-motor whereby the latter will sense pressures downstream of the carburetor control means and turbocharger, said servo-motor including means operated by pressures in said manifold which are above atmospheric to urge said carburetor control means in the opposite direction and thereby limit manifold pressure to prevent an unsafe power output resulting from an increase in turbine speed following an increase in throttle opening due to governor action.

2. The combination as recited in claim 1 wherein the carburetor control means includes a second valve downstream of the throttle valve which is operated by the governor.

References Cited by the Examiner

UNITED STATES PATENTS

| | | | |
|---|---|---|---|
| 2,138,100 | 11/1938 | Howard | 123—103 |
| 2,221,201 | 11/1940 | Pope et al. | 123—103 |
| 2,328,452 | 8/1943 | Hobart | 123—103 |
| 2,517,501 | 8/1950 | Mennesson | 123—103 |
| 2,529,437 | 11/1950 | Weinberger | 123—103 |
| 2,722,926 | 11/1955 | Bradnick | 123—103 |
| 2,767,700 | 10/1956 | Parks | 123—140 |
| 3,133,555 | 5/1964 | Powell et al. | 123—103 X |

MARK NEWMAN, *Primary Examiner.*

LAURENCE M. GOODRIDGE, *Examiner.*